US006807288B2

(12) United States Patent
Inagaki (10) Patent No.: US 6,807,288 B2
(45) Date of Patent: Oct. 19, 2004

(54) IMAGE PROCESSING APPARATUS, IMAGE PROCESSING METHOD, AND RECORDING MEDIUM RECORDING IMAGE PROCESSING PROGRAM

(75) Inventor: Daisuke Inagaki, Osaka (JP)

(73) Assignee: Keyence Corporation, Osaka (JP)

( * ) Notice: Subject to any disclaimer, the term of this patent is extended or adjusted under 35 U.S.C. 154(b) by 674 days.

(21) Appl. No.: 09/901,298

(22) Filed: Jul. 9, 2001

(65) Prior Publication Data

US 2002/0051561 A1 May 2, 2002

(30) Foreign Application Priority Data

Oct. 31, 2000 (JP) ...................................... P.2000-333803

(51) Int. Cl.[7] .............................. G06K 9/00; H04N 5/14
(52) U.S. Cl. ...................................... 382/106; 348/700
(58) Field of Search .................................. 382/103, 106, 382/107, 219, 220, 221, 276, 295; 348/94, 95, 119, 135, 140, 142, 154, 155, 208.6, 348, 699, 700, 701; 396/89, 95, 114

(56) References Cited

U.S. PATENT DOCUMENTS

| | | | | |
|---|---|---|---|---|
| 4,552,445 A | * | 11/1985 | Mukai et al. ................ | 396/114 |
| 5,587,762 A | * | 12/1996 | Watanabe ..................... | 396/95 |
| 5,915,033 A | * | 6/1999 | Tanigawa et al. ............ | 382/106 |
| 6,049,354 A | * | 4/2000 | Sekine et al. ............. | 348/208.6 |
| 6,108,435 A | * | 8/2000 | Mori et al. .................. | 382/106 |
| 6,278,489 B1 | * | 8/2001 | Hirasawa ..................... | 348/348 |
| 6,285,393 B1 | * | 9/2001 | Shimoura et al. ........... | 348/119 |
| 6,445,409 B1 | * | 9/2002 | Ito et al. ...................... | 348/155 |

FOREIGN PATENT DOCUMENTS

| | | | |
|---|---|---|---|
| JP | 8-33005 | 2/1996 | ........... H04N/17/00 |
| JP | 10-124678 | 5/1998 | ............. G06T/7/00 |

* cited by examiner

*Primary Examiner*—Andrew W. Johns
*Assistant Examiner*—Amir Alavi
(74) *Attorney, Agent, or Firm*—Kilyk & Bowersox, P.L.L.C.

(57) ABSTRACT

A real picked-up image containing an image of a position detection mark 13 is picked up by an image pickup unit 1 and the real picked-up image is stored in image memory 5 through an interface section 2. A pseudo image on which change in an image pickup conditions is reflected is generated from the stored real picked-up image by a CPU 6. When the pseudo image is moved, an image of the object is detected using a predetermined image processing parameter at each move position, and a position detection error of the image of the object relative to the move distance of the pseudo image is calculated.

21 Claims, 6 Drawing Sheets

IMAGE PROCESSING APPARATUS, IMAGE PROCESSING METHOD, AND RECORDING MEDIUM RECORDING IMAGE PROCESSING PROGRAM

BACKGROUND OF THE INVENTION

1. Field of the Invention

This invention relates to an image processing apparatus and an image processing method for generating a pseudo image on which change in the image pickup conditions is reflected, from a real image containing an image of an object, and a recording medium recording an image processing program.

2. Description of the Related Art

In related art, an image processing apparatus picks up an image of an object with an image pickup unit, such as a camera, and detects the object from the real image containing the image of the object. For example, an image processing apparatus is used to detect the position of an object, such as a position detection mark of a product, which is transported on a belt conveyor in a production line of a factory, and execute later steps using the detected position.

In the case of using an image processing apparatus in the factory as mentioned above, for example, the brightness in the factory changes due to the variation of weather conditions, time of day, illumination, and the like, thereby changing the image pickup conditions of the object. Thus, in the image processing apparatus of the related art, by operating the image processing apparatus, after actually changing the image pickup conditions, it can be determined whether or not the operation condition of the image processing apparatus, after the change in the image pickup conditions, is normal.

Some image processing apparatus generate a pseudo image from the real image of the object by changing the brightness, the object position, etc., with simulation, detect the object using the generated pseudo image, and then display the detection result such as a normal value or an abnormal value, impossible detection, or the like. In this case, the user can see the detection result, thereby making an estimation as to whether or not the operation condition of the image processing apparatus after change in the simulated image pickup conditions is normal.

However, to actually change the image pickup conditions and determine whether or not the operation condition of the image processing apparatus is normal, as described above, it requires a long time to set the image pickup conditions, etc. Thus the detection accuracy of the image processing apparatus, after change in the image pickup conditions cannot be determined in a short time. Particularly, once the image processing apparatus is installed in a manufacturing line, to determine whether or not the operation condition of the image processing apparatus is normal, the manufacturing line needs to be stopped, and thus a sufficient time cannot be taken for examining the detection accuracy of the image processing apparatus.

Even the image processing apparatus, which simulates change in the image pickup conditions such as brightness, is intended for making an estimation as to whether or not the operation condition of the image processing apparatus is normal. Thus the range of the image pickup conditions, in which the normal operation can be performed, is simply known and the detection accuracy of the object after change in the image pickup conditions cannot be quantitatively measured.

SUMMARY OF THE INVENTION

It is therefore an object of the invention to provide an image processing apparatus, an image processing method, and a recording medium that contains an image processing program, which makes it possible to measure quantitatively the detection accuracy of an object in response to an assumed image pickup condition change in a short time, without actually changing the image pickup conditions.

(1) First Embodiment of the Invention

According to a first embodiment of the invention, there is provided an image processing apparatus for generating a pseudo image (second image) on which change in image pickup conditions is reflected from a real image or real picked-up image (first image) containing an image of an object. The image processing apparatus comprises a capture section for capturing the real picked-up image, and a calculation section for processing the real picked-up image captured by the capture section to generate a pseudo image on which change in the image pickup conditions is reflected, detecting the image of the object contained in the pseudo image using a predetermined image processing parameter, while moving the pseudo image in order relative to the real picked-up image, and calculating a detection error of the image of the object contained in the pseudo image relative to a move distance of the pseudo image, as a pseudo image detection error.

In the image processing apparatus according to the invention, the real picked-up image is captured, a pseudo image on which change in the image pickup conditions is reflected is generated by processing the captured real picked-up image, the image of the object contained in the pseudo image is detected using the predetermined image processing parameter, while the pseudo image is moved in order relative to the real picked-up image, and a detection error of the image of the object contained in the pseudo image relative to the move distance of the pseudo image is calculated, as a pseudo image detection error.

The pseudo image on which change in the image pickup conditions relative to the real image is reflected is thus used to calculate a detection error of the image of the object, so that the detection accuracy of the object in response to an assumed image pickup condition change can be calculated in a short time, without actually changing the image pickup conditions. Since a detection error of the image of the object relative to the move distance of the pseudo image is calculated, the detection accuracy of the object in response to the assumed image pickup condition change can be measured quantitatively. Consequently, the detection accuracy of the object in response to the assumed image pickup condition change can be measured quantitatively in a short time without actually changing the image pickup conditions.

(2) Second Embodiment of the Invention

In an image processing apparatus according to a second embodiment of the invention, in the configuration of the image processing apparatus according to the first aspect of the invention, the calculation section comprises a generation section for processing the real picked-up image, captured by the capture section, to generate a pseudo image on which change in an image pickup conditions is reflected, and a first error calculation section for detecting the image of the object contained in the pseudo image using a predetermined image processing parameter at each move position, while moving the pseudo image, and calculating a detection error of the image of the object contained in the pseudo image relative to the move distance of the pseudo image, as a pseudo image detection error (second image detection error).

In this case, the captured real picked-up image is processed to generate a pseudo image on which change in the image pickup conditions is reflected. The image of the object contained in the pseudo image is detected using a predetermined image processing parameter at each move position, while the position of the generated pseudo image is moved in order, and a detection error of the image of the object contained in the pseudo image, relative to the move distance of the pseudo image is calculated, as the pseudo image detection error. Thus, the pseudo image detection error can be calculated in a short time and quantitatively.

(3) Third Embodiment of the Invention

In an image processing apparatus according to a third embodiment of the invention, the image processing apparatus further comprises a second error calculation section for using the real picked-up image captured by the capture section or an image generated by copying the real picked-up image as a reference image (third image), detecting the image of the object contained in the reference image using the predetermined image processing parameter at each move position while moving the reference image relative to the real picked-up image, and calculating a detection error of the image of the object contained in the reference image, relative to the move distance of the reference image as the reference image detection error (third image detection error).

In this case, the real picked-up image or the image generated by copying the real picked-up image is used as a reference image, the image of the object contained in the reference image is detected using the predetermined image processing parameter at each move position, while the position of the reference image is moved, and a detection error of the image of the object contained in the reference image relative to the move distance of the reference image is calculated, as the reference image detection error. Therefore, the detection error of the image of the object in conditions in which the image pickup conditions do not change can be calculated, so that the difference between the reference image detection error and the pseudo image detection error is calculated, whereby only the detection error caused by change in the image pickup conditions can be extracted, and the speed of the image processing apparatus relative to change in the image pickup conditions can be measured quantitatively and in a short time.

(4) Fourth Embodiment of the Invention

In an image processing apparatus according to a fourth embodiment of the invention, the image processing apparatus further comprises a change section, for varying the image processing parameter used in the first and second calculation sections, based on the pseudo image detection error and the reference image detection error.

In this case, the image processing parameter is changed based on the pseudo image detection error and the reference image detection error, so that the image processing parameter can be changed automatically to an optimum value after change in the image pickup conditions, and an image processing apparatus having a fast response to change in the image pickup conditions can be provided easily.

(5) Fifth Embodiment of the Invention

According to a fifth aspect of the invention, there is provided an image processing method for generating a pseudo image, on which change in image pickup conditions is reflected from a real picked-up image containing an image of an object. The image processing method comprises capturing the real picked-up image, processing the captured real picked-up image to generate a pseudo image, on which change in the image pickup conditions is reflected, detecting the image of the object contained in the pseudo image using a predetermined image processing parameter, while moving the pseudo image relative to the real picked-up image, and calculating a detection error of the image of the object contained in the pseudo image relative to the move distance of the pseudo image, as a pseudo image detection error.

In the image processing method according to the invention, the real image is captured, a pseudo image on which change in the image pickup conditions is reflected is generated by processing the captured real picked-up image, the image of the object contained in the pseudo image is detected, using the predetermined image processing parameter, while the pseudo image is moved relative to the real picked-up image, and a detection error of the image of the object contained in the pseudo image relative to the move distance of the pseudo image is calculated as a pseudo image detection error.

The pseudo image on which change in the image pickup conditions is reflected relative to the real picked-up image is thus used to calculate a detection error of the image of the object, so that the detection accuracy of the object in response to the assumed image pickup condition change can be calculated in a short time without actually changing the image pickup conditions. Since a detection error of the image of the object, relative to the move distance of the pseudo image is calculated, the detection accuracy of the object in response to the assumed image pickup condition change can be measured accurately. Consequently, the detection accuracy of the object, in response to the assumed image pickup condition change can be measured quantitatively in a short time without actually changing the image pickup conditions.

(6) Sixth Embodiment of the Invention

According to the sixth embodiment of the invention, there is provided a computer-readable recording medium, having recorded thereon, an image processing program for performing the image processing to generate a pseudo image, on which change in image pickup conditions is reflected from a real picked-up image containing an image of an object. The image processing program causes or directs a computer to perform the following steps: capturing the real picked-up image, processing the captured real picked-up image to generate a pseudo image on which change in the image pickup conditions is reflected, detecting the image of the object contained in the pseudo image using a predetermined image processing parameter, while moving the pseudo image relative to the real picked-up image and calculating a detection error of the image of the object contained in the pseudo image, relative to the move distance of the pseudo image, as a pseudo image detection error.

According to the image processing program of the invention, the real picked-up image is captured, a pseudo image is generated by processing the real picked-up image, the image of the object contained in the pseudo image is detected using the predetermined image processing parameter, while the pseudo image is moved relative to the real picked-up image, and a detection error of the image of the object contained in the pseudo image, relative to the move distance of the pseudo image, is calculated as a pseudo image detection error.

The pseudo image on which change in the image pickup conditions is reflected relative to the real picked-up image is thus used to calculate a detection error of the image of the object, so that the detection accuracy of the object in response to the assumed image pickup condition change can be calculated in a short time without actually changing the image pickup conditions. Since a detection error of the image of the object relative to the move distance of the pseudo image is calculated, the detection accuracy of the object in response to the assumed image pickup condition change can be measured accurately. Consequently, the detection accuracy of the object in response to the assumed image pickup condition change can be measured quantitatively in a short time without actually changing the image pickup conditions.

DETAILED DESCRIPTION OF THE PREFERRED EMBODIMENT

An image processing apparatus will be discussed that picks up an image of an object in a production line of a factory, etc., and detects the image of the object from a real image (i.e., real picked-up image) containing the image of the object. [as an embodiment of an image processing apparatus according to the invention]. For example, the image processing apparatus is used for various applications including: presence or absence [inspection] of sell-by date, substrate hole inner diameter measurement, sheet material width measurement, lead pitch measurement, wiring cable detachment detection, robot handling control, etc. However, the image processing apparatus incorporating the invention is not limited to the above-mentioned applications; the invention can be applied to various image processing apparatus for detecting the position of an object, inspecting an object, etc.

Figure 1:
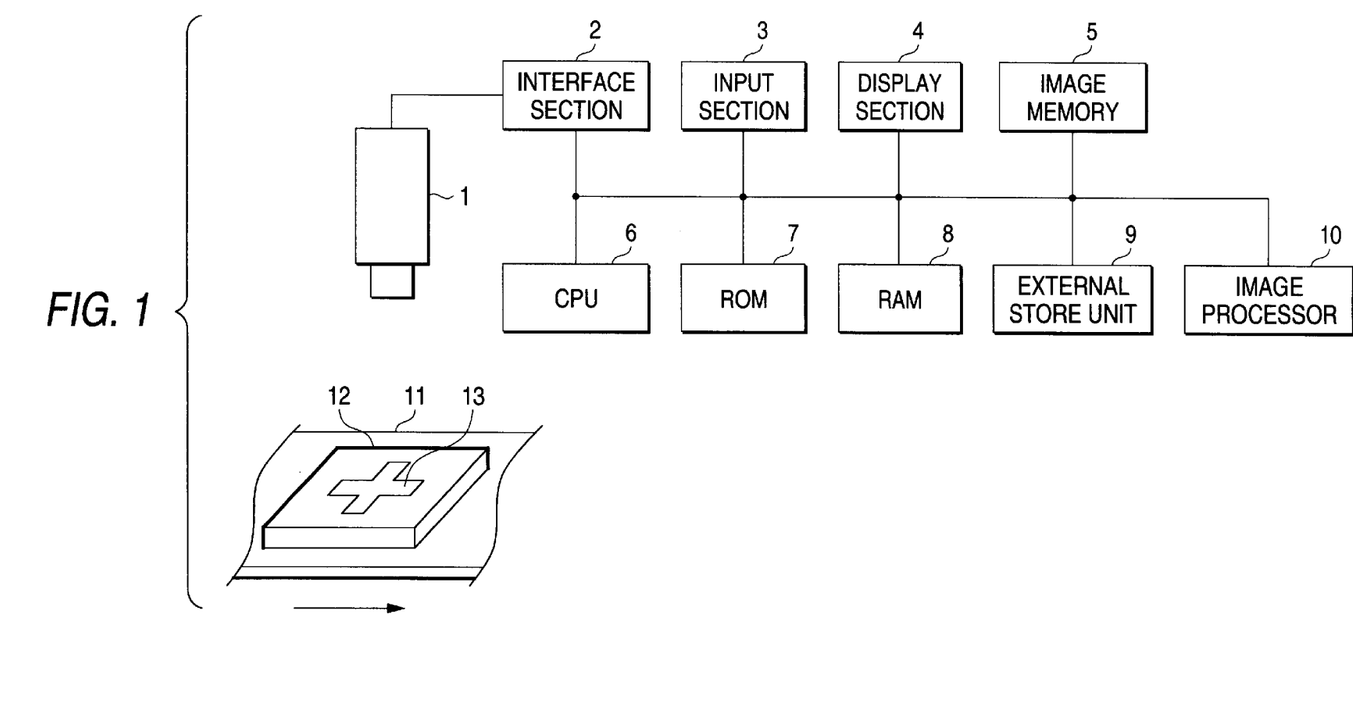
FIG. 1 is a block diagram to show the configuration of an image processing apparatus according to an embodiment of the invention.

FIG. 1 is a block diagram to show the configuration of an image processing apparatus according to an embodiment of the invention. The image processing apparatus shown in FIG. 1 comprises an image pickup unit 1, an interface section 2, an input section 3, a display section 4, an image memory 5, a CPU (central processing unit) 6, ROM (read-only memory) 7, RAM (random access memory) 8, and an external storage unit 9. The image memory 5 may be provided as a part of the RAM 8. The image processing apparatus may further include an image processor 10.

As shown in FIG. 1, it is assumed that, for example, a circuit board 12 formed with a position detection mark 13 as an object which is shaped substantially like a cross, is placed on a conveyor 11 in a production line of a factory, and is transported in the arrow direction in the figure.

The image pickup unit 1 may be, for example, a two-dimensional image pickup unit of an area sensor, a line sensor, etc., consisting of a CCD (charge-coupled device), and the like. When a detection apparatus (not shown) detects the circuit board 12 being transported to a predetermined position, the image pickup unit 1 picks up the image of the circuit board 12 containing the position detection mark 13 and outputs an image signal corresponding to the real picked-up image picked up to the interface section 2.

The image processing apparatus incorporating the invention is not limited to an apparatus containing an image pickup unit as shown in the embodiment. For example, it may be configured as an image processing apparatus wherein a real image picked up by a separate image pickup unit is stored on a predetermined storage medium, etc., and the real picked-up image read from the storage medium, etc., is processed.

The interface section 2, the input section 3, the display section 4, the image memory 5, the CPU 6, the ROM 7, the RAM 8, and the external storage unit 9 are connected to one another by a predetermined bus and the CPU 6 controls the operation of the components.

The interface section 2 converts the image signal output from the image pickup unit 1 from an analog signal into a digital signal and stores the image signal converted into the digital signal in the image memory 5 under the control of the CPU 6. The interface section 2 and the image memory 5 may be connected directly and the image signal, namely, the real picked-up image, etc., may be stored directly in the image memory 5 from the interface section 2.

The input section 3 is made up of a keyboard, a mouse, etc., and is used by the user for entering various commands, etc.

The display section 4 is composed of a CRT (cathode-ray tube), a liquid crystal display, etc., for displaying a real picked-up image, a pseudo image, and the like described later and also displaying a position detection error, etc., described later on various display screens. The unit for presenting a position detection error, etc., to the user is not limited to this example and may be an output unit such as a printer if it can inform the user of a position detection error, etc.

The image memory 5 is composed of, for example, as a semiconductor storage unit, etc., appropriate for storing a two-dimensional image and stores a real picked-up image, a pseudo image, a reference image, and the like described later and outputs each stored image as required under the control of the CPU 6.

A system program is stored in the ROM 7. The external storage unit 9 is composed of a hard disk drive, etc., for storing an image processing program, image processing parameters, and the like for performing image processing described later. A recording medium drive such as a CD-ROM drive or a floppy disk drive may be used as the external storage unit for reading the image processing program recorded on a recording medium such as a CD-ROM or floppy disk recording medium.

The CPU 6 executes the image processing program stored in the external storage unit 9 on the RAM 8 and controls the operation of the components. The RAM 8 is used as a work area of the CPU 6, etc. The image processor 10 may execute the image processing program.

In the embodiment, the image pickup unit 1 and the interface section 2 correspond to the capture section, and the image memory 5 and the CPU 6 correspond to the calculation section. The image memory 5 and the CPU 6 correspond to the generation section, and the CPU 6 corresponds to first error calculation section. The image memory 5 and the CPU 6 correspond to the second error calculation section, and the CPU 6 corresponds to change section.

Figure 2:
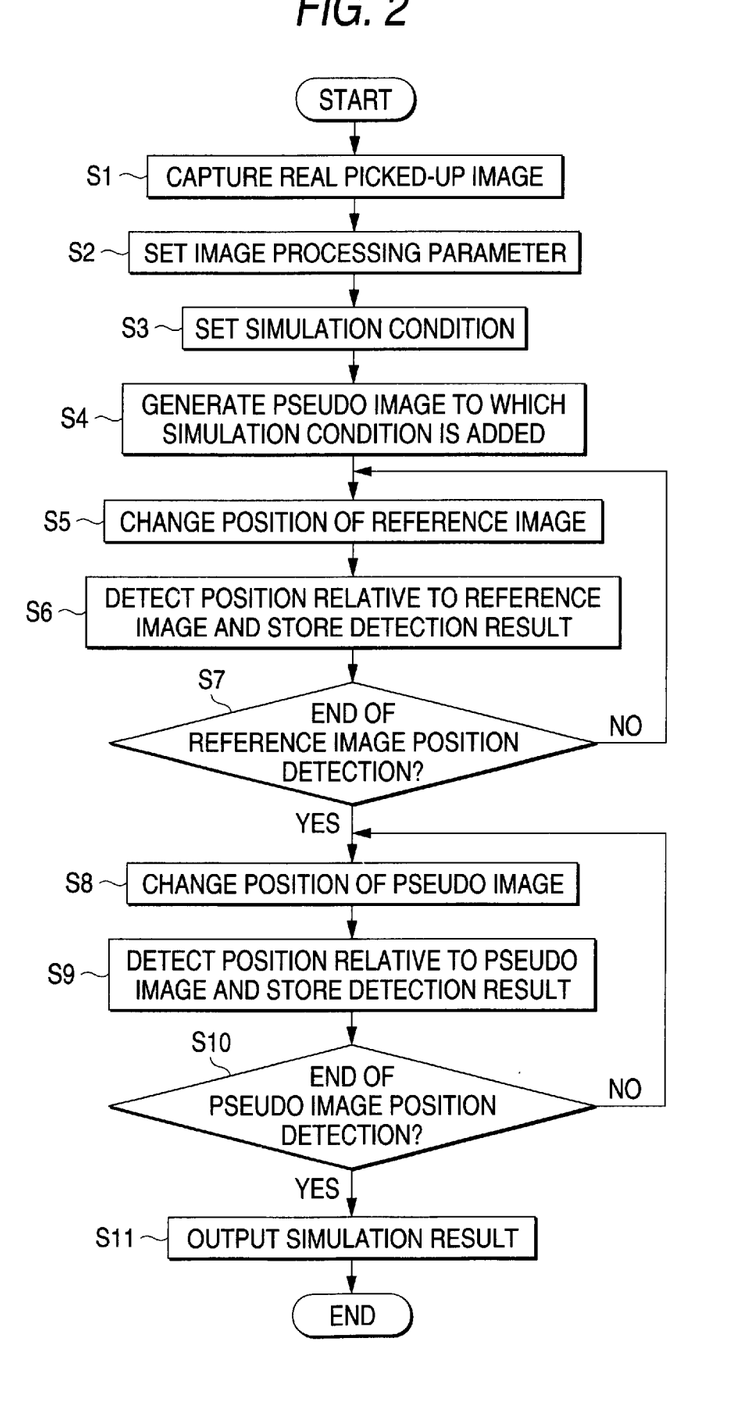
FIG. 2 is a flowchart to describe the process of the image processing apparatus shown in FIG. 1.

Next, the operation of the image processing apparatus described above will be discussed. FIG. 2 is a flowchart to describe the image processing of the image processing apparatus shown in FIG. 1.

First, at step S1, the image pickup unit 1 picks up a real picked-up image containing an image of the position detection mark 13 and the CPU 6 stores the real picked-up image input via the interface section 2 in the image memory 5. At this time, the CPU 6 reads the real picked-up image stored in the image memory 5, copies the read real picked-up image to generate a reference image, and stores the generated reference image in the image memory 5. The real picked-up image may be used as a reference image without copying the real picked-up image and the real picked-up image may be simply moved in order for calculating a position detection error according to the process described later.

Figure 3:
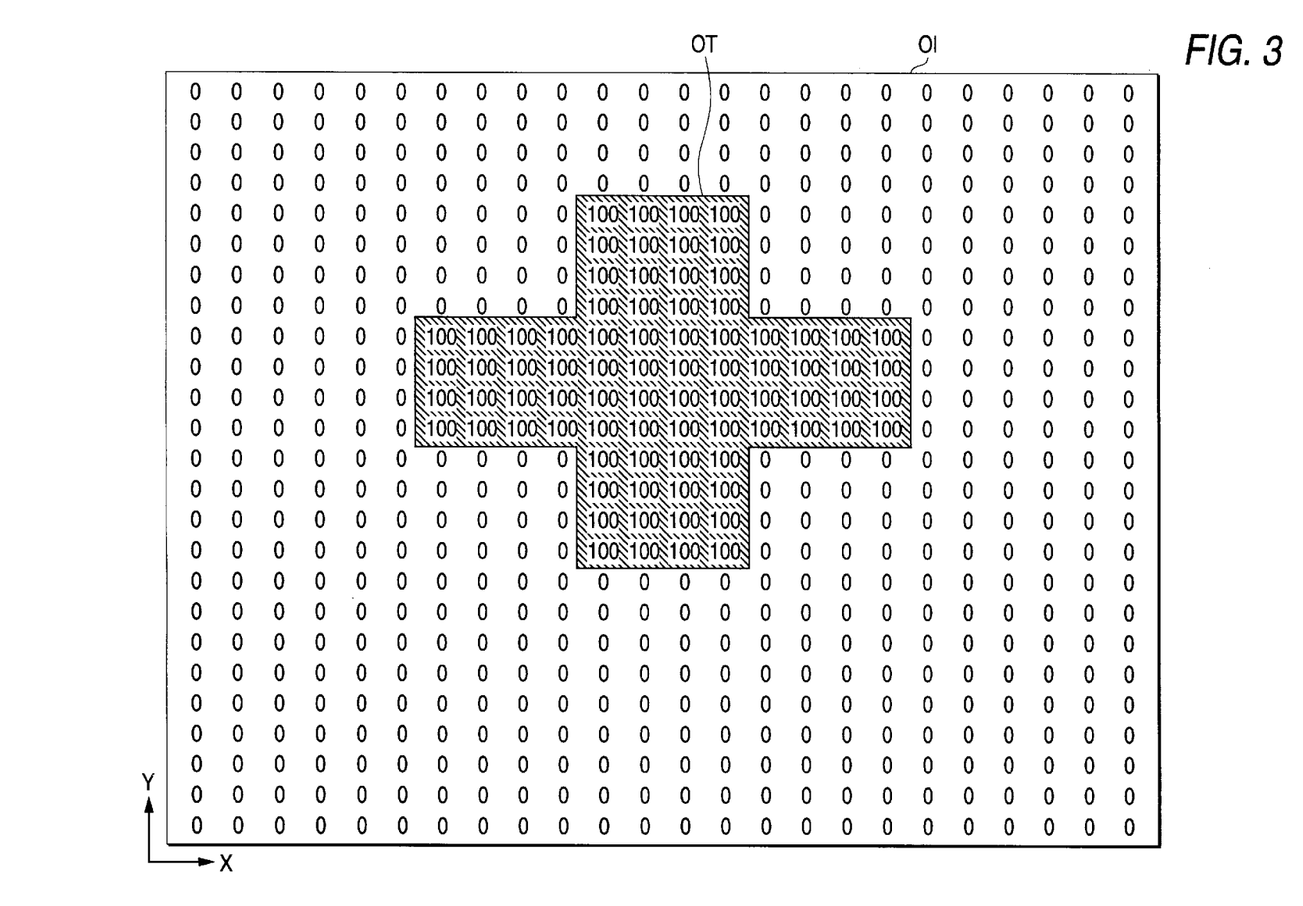
FIG. 3 is a drawing to schematically show an embodiment of a real image picked up by an image pickup unit shown in FIG. 1.

FIG. 3 is a drawing to schematically show an embodiment of a real image picked up by the image pickup unit 1 shown in FIG. 1.

A real picked-up image containing an image of the position detection mark 13 is picked up by the image pickup unit 1, an image signal is converted into a digital signal by the interface section 2, and real picked-up image OI, for example, shown in FIG. 3, is stored in the image memory 5.

In the embodiment shown in FIG. 3, the real picked-up image OI containing an image OT of the position detection mark 13 is shown, each numeric value in the figure represents the brightness at the corresponding position. 100 is shown as the brightness of the image OT of the position detection mark 13, and 0 is shown as the brightness of the background other than the position detection mark 13. In this case, a portion high in brightness is detected according to the image process described later, whereby the image OT of the position detection mark 13 can be detected from the real picked-up image OI.

Next, the user uses the input section 3 to select any desired image processing parameter from among a plurality of image processing parameters contained in the image processing program stored in the external storage unit 9. At step S2, the CPU 6 sets the selected image processing parameter as the image parameter used for the later position detection process.

At this time, the user may specify the necessary minimum area containing the image of the position detection mark 13 as a search range and the image processing described later may be performed in the specified search range. In this case, the object detection area can be set to the necessary minimum and the detection processing time can be shortened.

The image processing parameters will be discussed in detail. The image processing parameters are parameters used for the position detection process of an object and include a detection algorithm, a reference pixel, number of searched objects, correlation threshold value, number of search steps, image compression rate, presence or absence of interpolation at image compression time, search skip width, correlation threshold value of search skip transition, angle skip width of angle detection, contrast inversion correspondence, brightness difference, subpixel calculation method, and the like. Each parameter changes in response to the used position detection algorithm, etc.

The number of searched objects is the number returned as the result of searching images of objects and specifies how many objects exist in the search range, etc.

The correlation threshold value is the minimum correlation value (index indicating the similarity degree) to retrieve an image of an object and recognize it as an object. Only the object exceeding the correlation threshold value is returned as the search result.

The number of search steps is the number of steps when the search process is divided into a plurality of steps for execution. Various values are set in response to the size of the search area, the required detection processing time, etc. The number of search steps generally is set from two to four so that a coarse search is executed initially and then a tighter search is executed later.

The image compression rate is a value for determining the amounts of compression of the image to be searched, and can be set for an X-axis, for a Y-axis, and for each step. Normally, to shorten the detection processing time, the image to be processed is compressed for processing and the compression degree relates to the steps of the search process. For example, the image is compressed to 1/16 (image compression rate 16) at the first step, is compressed to 1/4 (image compression rate 4) at the next stage, and is compressed to 1/1 (no compression, namely, image compression rate 1) at the last stage. As the image compression rate is increased, the detection processing time is shortened, but erroneous detection easily occurs.

The presence or absence of interpolation at an image compression time is a parameter for specifying compression processing with pixels either simply thinned out or the interpolation process of calculating an average of nearby pixels when the above-mentioned compression process is performed. If interpolation processing is not performed, the detection processing time is shortened, but the effect of a quantization error may cause erroneous detection.

The search skip width is a skip width for searching an image while skipping a given spacing, and without searching all of the area of the image, and can be set for the X-axis, for the Y-axis, and for each step. If the spacing of the search skip width is set to a high value, the detection processing time is shortened, but erroneous detection easily occurs.

The correlation threshold value of the search step transition is the threshold value of the correlation value for making a transition to the next step when the search process is divided into a plurality of steps. If many objects having the specified correlation threshold value as the number of searched objects are found, the process at the current step is stopped at that time and proceeds to process the next step. This eliminates the need for searching the full range of the image and the detection processing time is shortened, but erroneous detection easily occurs if the correlation threshold value is set incorrectly.

The angle skip width of angle detection is a value to specify the angle interval to execute a search in a rotational direction, and is set for each step. If the angle skip width is set too large, the detection processing time is shortened, but erroneous detection easily occurs.

The contrast inversion correspondence is a parameter for specifying whether or not the contrast inversion is enabled.

The brightness difference is the tolerance of the brightness difference between the corresponding pixels. To add the brightness difference to the determination of an object, the value of the brightness difference is set small.

The subpixel calculation method is a parameter to set an algorithm for calculating the position of the image of an object with a resolution of one pixel or less. A predetermined algorithm is selected from among a plurality of algorithms in response to the required detection accuracy and detection processing time.

Next, the user uses the input section 3 to select any desired simulation condition from among a plurality of simulation conditions. At step S3, the CPU 6 sets the selected simulation condition as the simulation condition used for the later image process.

The simulation conditions will be discussed in detail. The simulation condition is a condition used to generate a pseudo image by simulation. On the pseudo image, the change in the image pickup conditions relative to the real picked-up image is reflected. Namely, the pseudo image is an image almost equal to the image picked up in the image pickup conditions, but changed from the image pickup conditions of the real picked-up image. The change in the image pickup conditions includes change in the image pickup environment, change in the object conditions, and the like. For example, the change can be a geometric change in the image size, etc., linear change and nonlinear change of brightness, change caused by concealing, change caused by dirt, and the like.

In an embodiment, image processing programs of random noise, shading, defocus, concealing, dirt, and the like are selectable simulation conditions, and are contained in the image processing program. One or more of the simulation conditions are used in response to the assumed image pickup condition change, and the degree of each simulation condition may be set to any desired value, whereby a pseudo image on which change in the image pickup conditions relative to the real picked-up image can be generated.

Random noise is the process of virtually generating conditions in which noise occurs in an image. Shading is the process of multiplying the brightness of each pixel by a predetermined coefficient and virtually generating conditions in which the brightness of image changes from one position to another. Defocus is the process of virtually generating conditions in which an out-of-focus condition occurs. Concealing is the process of overwriting a part of the image of an object with a specified brightness and virtually generating conditions in which a part of the object is concealed. Dirt is the process of virtually generating conditions in which the object, etc., is dirty.

Next, at step S4, the CPU 6 reads the real picked-up image stored in the image memory 5, generates a pseudo image to which the setup simulation condition is added, and stores the generated pseudo image in the image memory 5.

Figure 4:
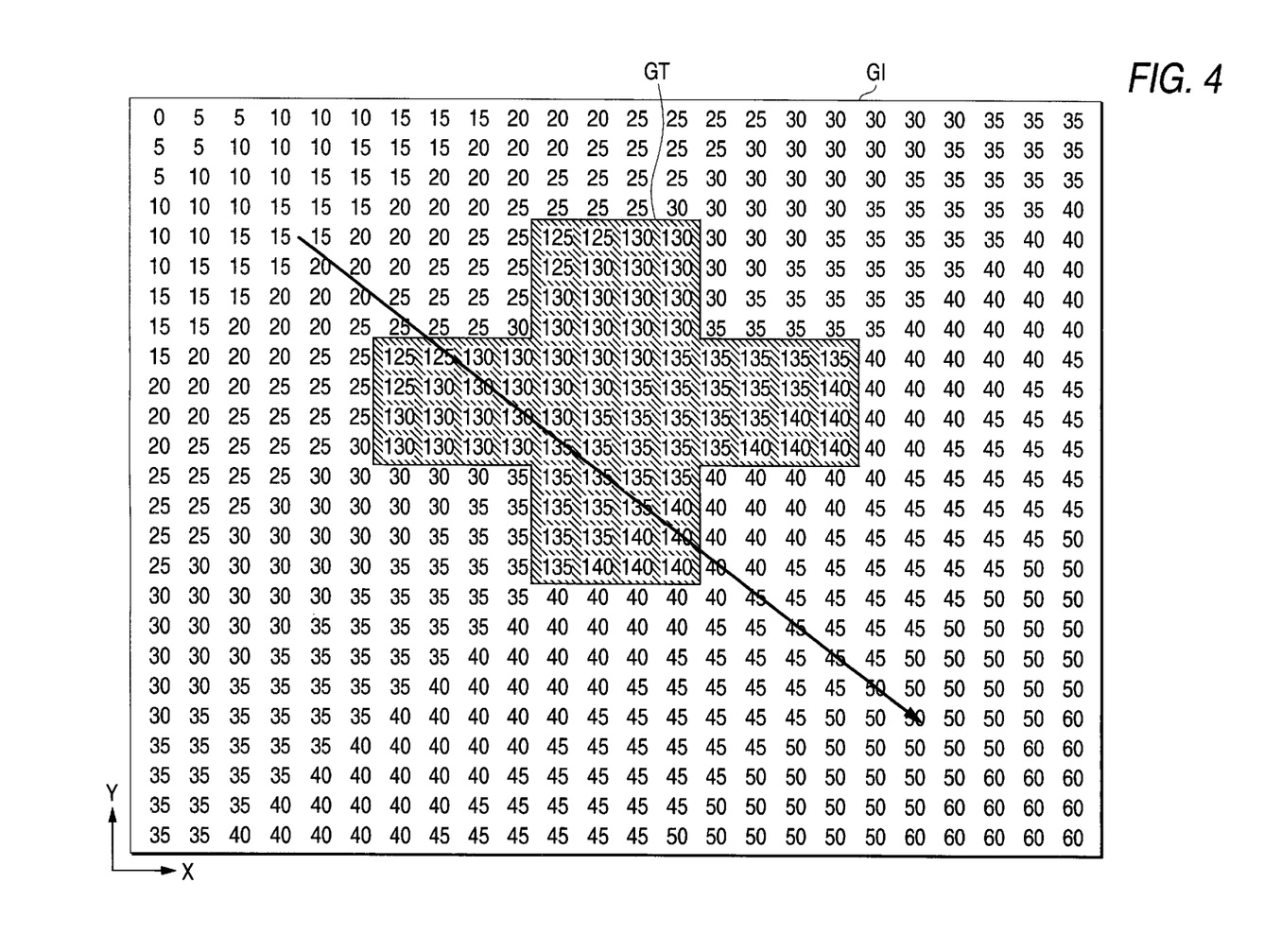
FIG. 4 is a drawing to schematically show an embodiment of a pseudo image provided by shading the real image shown in FIG. 3.

FIG. 4 is a drawing to schematically show an example of a pseudo image provided by shading the real picked-up image shown in FIG. 3. If shading or changing the whole brightness in the arrow direction in the figure, for example, is performed for the real picked-up image OI shown in FIG. 3, a pseudo image GI and an image GT of the position detection mark 13 with the brightness value incremented sequentially by a predetermined value along the arrow direction can be generated, and the pseudo image GI changed in brightness from the real picked-up image OI can be generated, as shown in FIG. 4.

Next, at step S5, the CPU 6 reads the reference image stored in the image memory 5, moves the position of the reference image by a predetermined move distance with respect to the real picked-up image, and generates a reference image shifted in position. The image moved in position can be generated by various methods, such as generating an image moved in memory or a method of translating the address in memory, thereby simulating a moved image. This also applies to step 8 described later.

Figure 5:
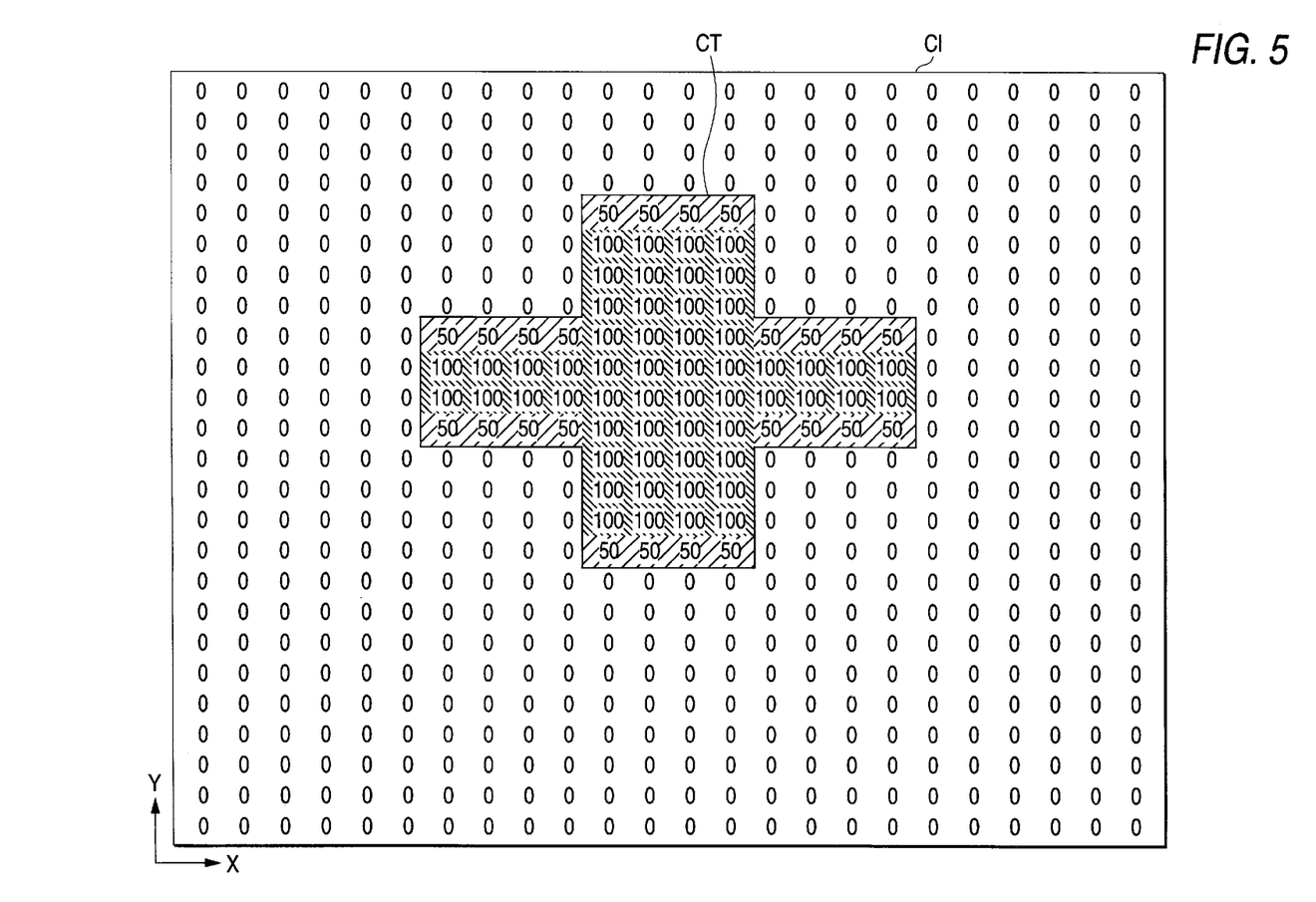
FIG. 5 is a drawing to schematically show an embodiment of an image resulting from moving the position of a reference image generated by copying the real picked-up image shown in FIG. 3.

FIG. 5 is a drawing to schematically show an embodiment of an image resulting from moving the position of a reference image, generated by copying the real picked-up image shown in FIG. 3. If the real picked-up image OI shown in FIG. 3 is copied to generate the reference image and the position of the generated reference image is moved by 0.5 pixel in a downward direction in the figure (negative direction of the Y-axis shown in FIG. 3) by an interpolation calculation, the reference image CI shown in FIG. 5 is generated.

In this case, the brightness of each upper side of the image OT of the position detection mark 13 shown in FIG. 3 is 100, but the brightness of each corresponding portion of an image CT of the position detection mark 13 shown in FIG. 5 is changed to 50. The brightness of each position just below each upper side of the image OT of the position detection mark 13 is 0, but the brightness of each corresponding portion of the image CT of the position detection mark 13 is changed to 50.

Therefore, image CT moved downward by 0.5 pixel with respect to the image OT of the position detection mark 13 is generated, and the reference image CI moved downward by 0.5 pixel with respect to the real picked-up image OI is also generated.

Since the position detection process described later is performed for the generated reference image whose position is shifted, the reference image whose position is shifted needs to be sufficiently and closely analogous to the real picked-up image. In an embodiment, to check the detection accuracy of one pixel or less, as an interpolation method, for example, an interpolation method with a changed coefficient based on a bi-cubic interpolation method (tertiary convolution interpolation) is used. In this case, a reference image sufficiently and closely analogous to the real picked-up image and shifted in position precisely by a predetermined amount can be generated. The object position detection process described later can be executed with high accuracy.

The move of the image used when a position detection error is calculated is not limited to the above-described example. The image may be moved in parallel along the X-axis, orthogonal to the Y-axis, and may be moved in a slanting direction in combination of both directions of the X and Y axes, and various other types of move processes such as rotating the image by a predetermined angle from a predetermined center point may also be performed. The move distance of the image is not limited if the position detection accuracy can be checked sufficiently. For example, the reference image may be moved 0.05 pixel at a time in the range of ± one pixel with respect to the X-axis and the Y-axis or may be moved a predetermined angle at a time in the angle range of 360 degrees. Various changes are possible.

Next, at step S6, the CPU 6 executes a position detection process of the image of the position detection mark 13 from the reference image, whose position is moved using the image processing parameter set at step S2. The CPU 6 stores the move distance of the reference image and a position detection error in the RAM 8 as the detection result.

The position detection process of the present invention is not limited to the detection based on the image processing parameter mentioned above. For example, the position of the object can be detected by pattern matching. The upper and lower limit values of data for determining a match may be set, and the image match degree may be determined by normalization correlation, and the like. Detection of an object is also not limited to the detection based on the position of the object mentioned above. The object may also be detected based on the contour, the area, the center of gravity, and the like, of the object.

Next, at step S7, the CPU 6 determines whether or not the position detection process of the reference image terminates for all move distances in the move range required for checking the position detection accuracy. If the position detection process of the reference image terminates for all move distances, the CPU 6 goes to step S8; otherwise, the CPU returns to step S5 and moves the reference image in order and continues to calculate a position detection error relative to each move distance.

According to the described process, the position of the reference image is moved from the conditions in which the reference image is positioned, relative to the real picked-up image. The position of the image of the object contained in the reference image is detected at each move position using the setup image processing parameter, and then a position detection error of the image of the object contained in the reference image relative to the move distance of the reference image can be calculated.

Next, at step S8, the CPU 6 reads the pseudo image stored in the image memory 5, moves the position of the read pseudo image by a predetermined move distance relative to the real picked-up image, and generates the pseudo image shifted in position, as at step S5.

Next, at step S9, the CPU 6 executes a position detection process of the image of the position detection mark 13 from the pseudo image, whose position is moved using the image processing parameter set at step S2. The CPU 6 stores the move distance of the pseudo image and a position detection error as the detection result in the RAM 8 as at step S6.

Next, at step S10, the CPU 6 determines whether or not the position detection process of the pseudo image terminates for all move distances in the move range required for checking the position detection accuracy. If the position detection process of the pseudo image terminates for all move distances, the CPU 6 goes to step S11; otherwise, the CPU returns to step S8 and moves the pseudo image in order and continues to calculate a position detection error relative to each move distance as at step S7.

According to the described process, the position of the pseudo image is moved from the conditions in which the pseudo image is positioned relative to the real picked-up image. The position of the image of the object contained in the pseudo image is detected at each move position using the setup image processing parameter, and a position detection error of the image of the object contained in the pseudo image relative to the move distance of the pseudo image can be calculated.

Next, at step S11, the CPU 6 reads the position detection error of the image of the object relative to the move distance of the pseudo image, and the position detection error of the image of the object relative to the move distance of the reference image, calculated according to the described process from the RAM 8, and displays the position detection errors of the pseudo image and the reference image on the display section 4 as numeric values, a graph, or the like, as the simulation result.

Figure 6:
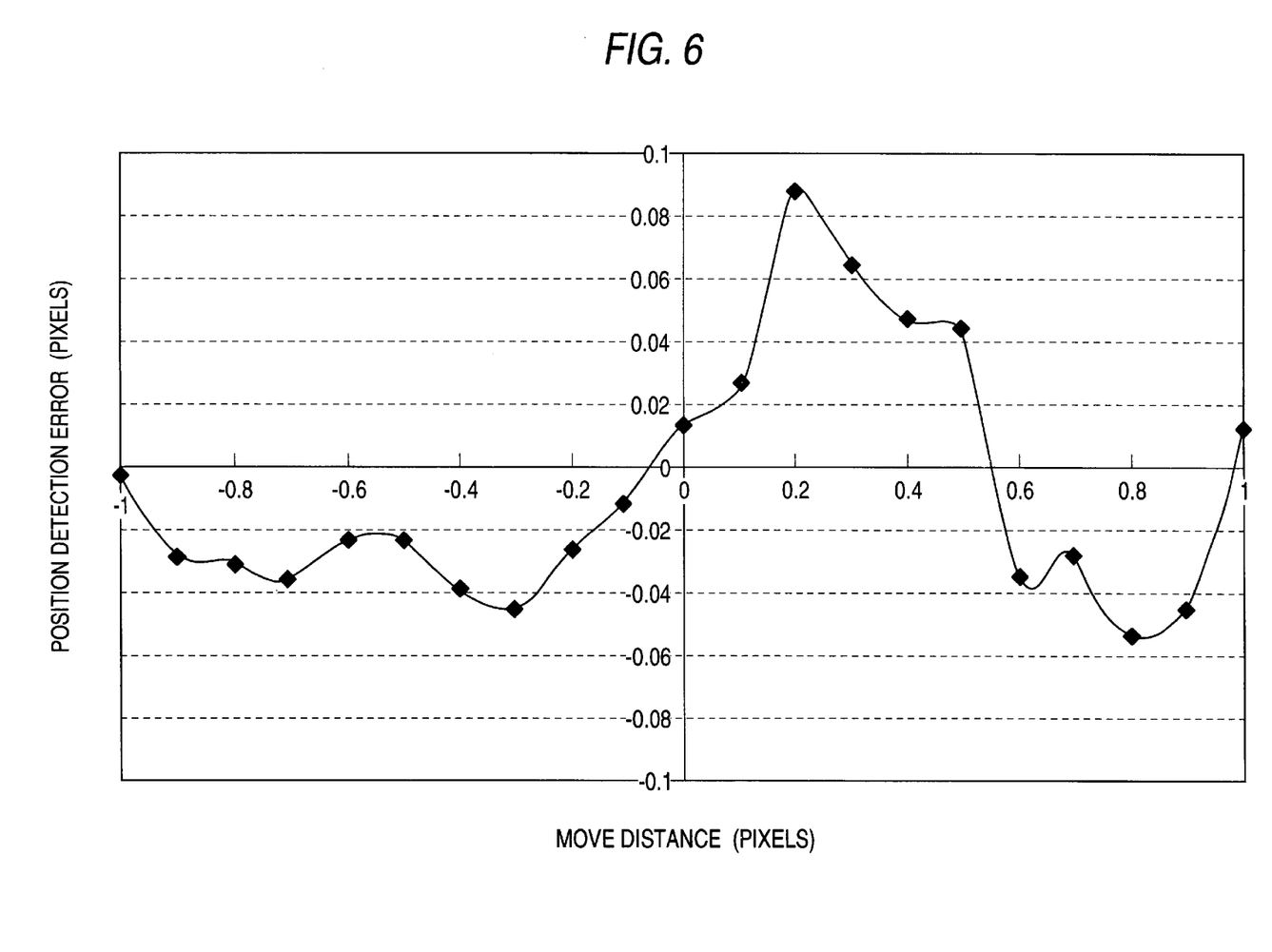
FIG. 6 is a drawing to show the relationship between the move distance and position detection error, when a reference image is moved in the X-axis direction as an embodiment of a position detection error of the reference image.

FIG. 6 is a drawing to show the relationship between the move distance and position detection error, when the reference image is moved in the X-axis direction as an embodiment of the position detection error of the reference image. In the example shown in FIG. 6, if the reference image is moved 0.1 pixel at a time in the range of ± one pixel, the position detection error changes as shown in the figure. Therefore, the user can quantitatively keep track of the position detection error of the object. The move range may be ± 10 pixels or may be other ranges.

Such a position detection error is also displayed for the pseudo image and change in the position detection error relative to the move distance of each image can be measured quantitatively as useful data for changing the image processing parameter. At this time, in addition to the position detection error of the pseudo image and the position detection error of the reference image, a difference therebetween may be calculated by the CPU 6 and the calculated difference may be displayed directly.

Thus, the user can quantitatively measure the degree of a possibility of erroneous detection for the simulation condition, namely, the assumed image pickup condition change if the setup image processing parameter is used, from the displayed difference between the position detection error of the pseudo image and the position detection error of the reference image, etc., and can take various steps.

That is, if erroneous detection occurs or a detection error is large, the user can reconsider the setup image processing parameters, and take steps such as lowering the image compression rate, etc., thereby changing the image processing parameter, so as to execute position detection with higher accuracy. If the position detection accuracy is equal to or less than the detection accuracy required by the user, although erroneous detection does not occur, the image processing parameter can be changed in a similar manner, whereby the object can be detected with the detection accuracy required by the user.

For example, to use shading as a simulation condition, the image processing parameter can be changed so as to reduce the effect of change in brightness, so that the image processing parameter to cope with assumed illumination environment change, etc., can be set.

If the problem of erroneous detection, etc., cannot be solved by changing the image processing parameter, the problem maybe solved by raising the optical magnification of the image pickup unit to provide an image with a higher resolution or improving the illumination environment, so that change in brightness does not occur.

Therefore, the user can set the image processing parameter, change the image pickup conditions, and so forth, so that any desired detection accuracy can be accomplished in response to the assumed image pickup condition change before the image processing apparatus is actually installed and operated in the production line, etc., of the factory.

As described above, in the embodiment, the pseudo image on which change in the image pickup conditions relative to the real picked-up image is reflected and the reference image generated by copying the real picked-up image are used to calculate a position detection error of the image of the object relative to the move distance of each image in different image pickup conditions by simulation, so that the position detection accuracy responsive to the assumed image pickup condition change can be measured quantitatively in a short time without actually changing the image pickup conditions.

In the description of the embodiment, the position detection error of the pseudo image and the position detection error of the reference image are displayed, whereby the user may change the image processing parameter based on the position detection error information, but the optimum image processing parameter may also be set automatically based on the information.

For example, if the CPU 6 determines that the difference between the position detection error of the pseudo image and the position detection error of the reference image stored in the RAM 8 is large, the image processing parameter may be changed automatically so that the position detection error declines with respect to the setup simulation condition in place of or following step S11 shown in FIG. 2.

In the description given above, the pseudo image is generated and the generated pseudo image is moved, but the real picked-up image may be moved and the pseudo image may be generated from the moved real picked-up image.

What is claimed is:

1. An image processing apparatus comprising:
    a capture section for capturing a first image containing an image of an object;
    a calculation section: for processing the captured first image to generate a second image on which change in image pickup conditions relative to the first image is reflected; for detecting the image of the object contained in the second image using an image processing parameter; and for calculating a detection error of the image of the object contained in the second image relative to a position difference between the first image and the second image as a second image detection error.

2. The image processing apparatus as claimed in claim 1, wherein said calculation section further comprises:
    a generation section for processing the captured first image to generate a second image on which change in image pickup conditions relative to the first image is reflected; and
    a first error calculation unit for detecting the image of the object contained in the second image using the image processing parameter at each move position when the second image is moved relative to the first image, and for calculating the detection error of the image of the object included in the second image relative to a move distance of the second image as the second image detection error.

3. The image processing apparatus as claimed in claim 2, further comprising:
    a second error calculation section for detecting the image of the object contained in a third image using the image processing parameter at each move position, when the third image is moved relative to the first image, the third image being one of the first image or an image obtained by copying the first image, and for calculating a detection error of the image of the object contained in the third image relative to a move distance of the third image as the third image detection error.

4. The image processing apparatus as claimed in claim 3, further comprising:
    a change section for changing the image processing parameter used in said first and second error calculation sections on the basis of the second image detection error and the third image detection error.

5. The image processing apparatus as claimed in claim 1, wherein said calculation section further comprises:
    a generation section for processing the captured first image while moving the first image within a predetermined range to generate the second image, on which change in image pickup conditions relative to the first image is reflected, at each move position; and
    a first error calculation unit for detecting the image of the object contained in the second image at each move position using the image processing parameter, and for calculating the detection error of the image of the object included in the second image relative to each move position as the second image detection error.

6. The image processing apparatus as claimed in claim 5, further comprising:
    a second error calculation section for detecting the image of the object contained in a third image using the image processing parameter at each move position when the third image is moved relative to the first image, the third image being one of the first image or an image obtained by copying the first image, and for calculating a detection error of the image of the object contained in the third image relative to a move distance of the third image as the third image detection error.

7. The image processing apparatus as claimed in claim 6, further comprising:
    a change section for changing the image processing parameter used in said first and second error calculation sections on the basis of the second image detection error and the third image detection error.

8. The image processing apparatus as claimed in claim 1, further comprising:
    a change section for changing the image processing parameter used in said calculation section on the basis of the second image detection error.

9. An image processing method comprising:
    capturing a first image containing an image of an object;
    processing the captured first image to generate a second image on which change in image pickup conditions relative to the first image is reflected;
    detecting the image of the object contained in the second image using an image processing parameter; and
    calculating a detection error of the image of the object contained in the second image relative to a position difference between the first image and the second image as the second image detection error.

10. The image processing method as claimed in claim 9, wherein said calculation step comprises:
    processing the captured first image to generate the second image on which change in image pickup conditions relative to the first image is reflected;
    detecting the image of the object contained in the second image using the image processing parameter at each move position when the second image is moved relative to the first image; and
    calculating the detection error of the image of the object included in the second image relative to a move distance of the second image as the second image detection error.

11. The image processing method as claimed in claim 10, further comprising:
    detecting the image of the object contained in a third image using the image processing parameter at each move position when the third image is moved in an order relative to the first image, the third image being one of the first image or an image obtained by copying the first image; and
    calculating a detection error of the image of the object contained in the third image relative to a move distance of the third image as the third image detection error.

12. The image processing method as claimed in claim 11, further comprising:
    changing the image processing parameter used in said detection steps on the basis of the second image detection error and the third image detection error.

13. The image processing method as claimed in claim 9, wherein said calculation step further comprises:
    processing the captured first image while moving the first image within a predetermined range to generate the second image, on which change in image pickup conditions relative to the first image is reflected, at each move position;
    detecting the image of the object contained in the second image at each move position using the image processing parameter; and calculating the detection error of the image of the object included in the second image relative to each move position as the second image detection error.

14. The image processing method as claimed in claim 13, further comprising:

detecting the image of the object contained in a third image using the image processing parameter at each move position when the third image is moved in an order relative to the first image, the third image being one of the first image or an image obtained by copying the first image; and calculating a detection error of the image of the object contained in the third image relative to a move distance of the third image as a third image detection error.

15. The image processing method as claimed in claim 14, further comprising:

changing the image processing parameter used in said detection steps on the basis of the second image detection error and the third image detection error.

16. The image processing method as claimed in claim 9, further comprising:

changing the image processing parameter used in said detection step on the basis of the second image detection error.

17. A recording medium recording a program for performing image processing, the program causing a computer to execute the following steps:

capturing a first image containing an image of an object;

processing the captured first image to generate a second image on which change in image pickup conditions relative to the first image is reflected;

detecting the image of the object contained in the second image using a image processing parameter; and calculating a detection error of the image of the object contained in the second image relative to a position difference between the first image and the second image as the second image detection error.

18. The recording medium as claimed in claim 17, wherein the program causes a computer to further execute the steps of:

processing the captured first image to generate the second image on which change in image pickup conditions relative to the first image is reflected;

detecting the image of the object contained in the second image using the image processing parameter at each move position when the second image is moved relative to the first image; and calculating the detection error of the image of the object included in the second image relative to the move distance of the second image as the second image detection error.

19. The recording medium as claimed in claim 18, wherein the program causes the computer to further execute the steps of:

detecting the image of the object contained in a third image using the image processing parameter at each move position when the third image is moved relative to the first image, the third image being one of the first image or an image obtained by copying the first image; and calculating a detection error of the image of the object contained in the third image relative to a move distance of the third image as the third image detection error.

20. The recording medium as claimed in claim 19, wherein the program causes the computer to further execute the steps of:

changing the image processing parameter used in said detection steps on the basis of the second image detection error and the third image detection error.

21. An image processing apparatus comprising:

a capture section comprising means for capturing a first image containing an image of an object;

a calculation section comprising means for processing the captured first image to generate a second image on which change in image pickup conditions relative to the first image is reflected; and means for detecting the image of the object contained in the second image using an image processing parameter; and means for calculating a detection error of the image of the object contained in the second image relative to a position difference between the first image and the second image as a second image detection error.

* * * * *